United States Patent

[11] 3,552,533

| [72] | Inventors | Jacob Nitz<br>Solon;<br>Glenn R. Graham, Novelty, Ohio |
|---|---|---|
| [21] | Appl. No. | 764,120 |
| [22] | Filed | Oct. 1, 1968 |
| [45] | Patented | Jan. 5, 1971 |
| [73] | Assignee | Abex Corporation<br>New York, N.Y.<br>a corporation of Delaware |

[54] CARBONIZED FRICTION ARTICLE
13 Claims, 11 Drawing Figs.
[52] U.S. Cl............................................................. 192/107,
192/70.14; 188/251; 161/35, 161/42; 117/46
[51] Int. Cl....................................................... F16d 13/60
[50] Field of Search.......................................... 192/107M,
107, 70.14; 188/250, 250A—7, 251A; 117/46CB;
161/35, 42 (Carbonizing)

[56] References Cited
UNITED STATES PATENTS

| 1,256,228 | 2/1918 | Hensley........................ | 188/251AUX |
| 2,175,399 | 10/1939 | Judd............................. | 192/107MX |
| 2,885,379 | 5/1959 | Komp et al. .................. | 188/251MX |
| 3,011,981 | 12/1961 | Soltes............................ | 161/Carbon |
| 3,072,558 | 1/1963 | Myers et al. .................. | 161/Carbon |
| 3,261,440 | 7/1966 | Graham et al................ | 192/107X |

Primary Examiner—Benjamin W. Wyche
Attorney—Richard MacCutcheon

ABSTRACT: A friction article is a structural part (rather than just a facing) substantially entirely of carbon. The article is made up from sooner or later carbonized filaments which are bonded with an ultimately carbonized resin. For some operational requirements it is appropriate to attach a wearing surface which could be carbon of a different sort or which might not be carbon.

PATENTED JAN 5 1971　　　　　　　　　　3,552,533
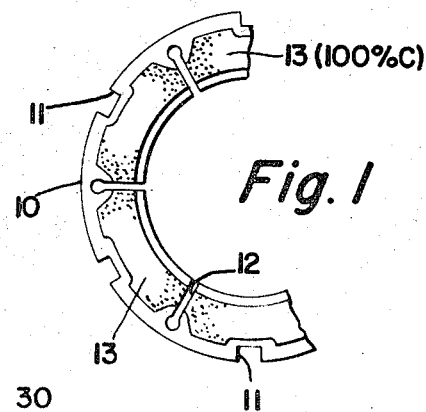
Fig. 1
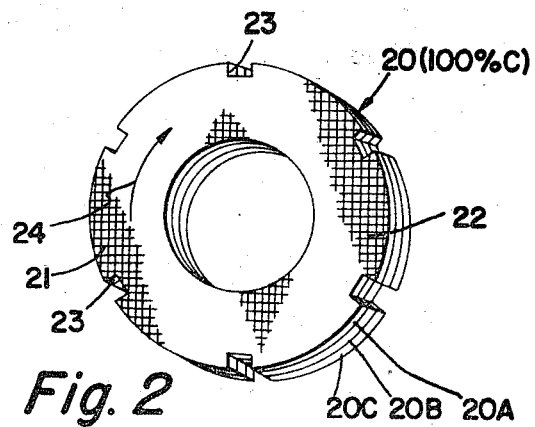
Fig. 2
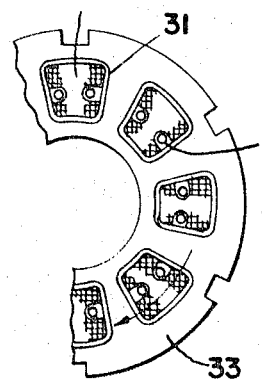
Fig. 3
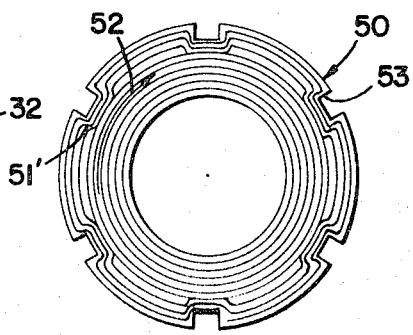
Fig. 5
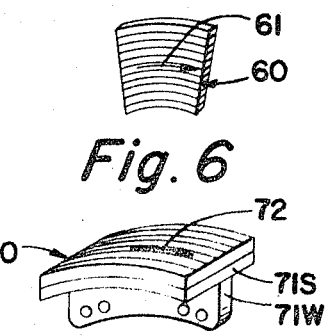
Fig. 6
Fig. 7
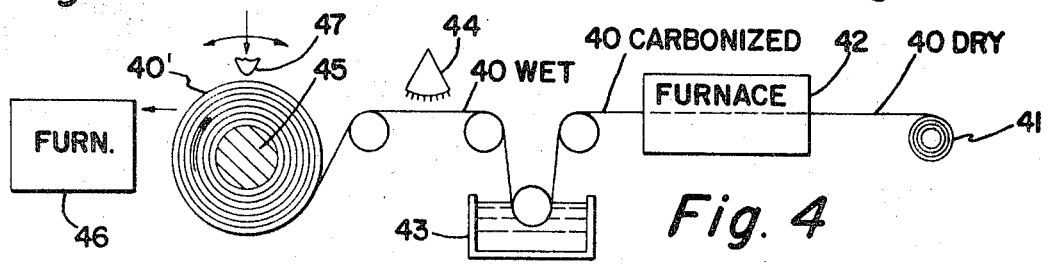
Fig. 4
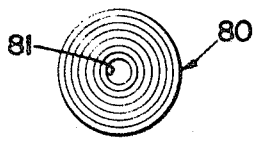
Fig. 8
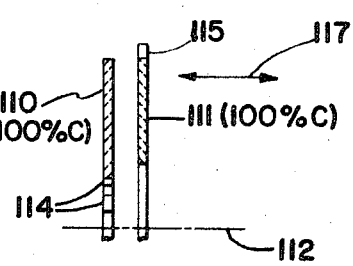
Fig. 10
Fig. 11
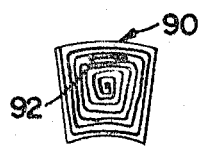
Fig. 9
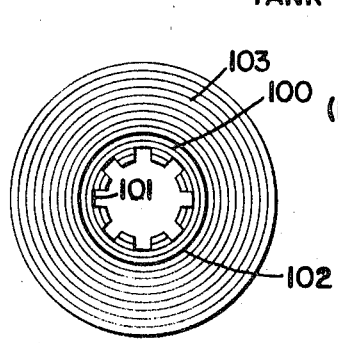
INVENTORS
JACOB NITZ
BY　GLENN R. GRAHAM
Richard H. MacCutcheon
ATTORNEY

CARBONIZED FRICTION ARTICLE

CROSS REFERENCE TO RELATED PATENTS

In U.S. Pat. No. 3,261,440 issued Jul. 19, 1966, upon an application filed by Graham, Echler and Nitz and assigned to the assignee of the present invention, there is described and claimed a highly porous predominantly graphitic friction facing which might contain a carbonized binder resin but is, in any event, for running in oil, and not a structural part.

BACKGROUND OF THE INVENTION

The present invention relates to friction articles for running in air (i.e., without a liquid coolant), and while such articles might be blocks or facings (intended to be supported within or upon a containing and/or backing means) they also have novel utility as complete structural parts as hereinafter explained. In the past, particularly for light weight high energy friction applications, as in large aircraft, there have been problems of excessive weight, of poor heat resistance, poor friction properties, rough engagements, seizure, welding and galling.

An object of the present invention is to provide simple means for overcoming the above mentioned difficulties.

SUMMARY OF THE INVENTION

The article of the invention is a substantially all carbon article. According to one preference, the article is wound up from one or more filaments sooner or later resin soaked with the whole article ultimately carbonized by sintering. According to another preference, the carbon-to-carbon bonded carbon article is laid up from flat filament reinforced sheets sooner or later carbonized and at one time or another impregnated with a carbonizable resin ultimately carbonized. As a third choice preference, the article is molded as from a mix of chopped carbonized or carbonizable, filament filler material and a later carbonized in situ resin binder. In any event, the originally or ultimately carbonized reinforcing filaments inherently have a greater strength than does the carbonized resin binder. The filaments can be used for strength alone and be "back of" an all carbon "friction face" having no filaments.

BRIEF DESCRIPTION OF THE DRAWING

Various objects and advantages will become apparent and the invention may be better understood from consideration of the following description taken in connection with the accompanying drawing in which:

FIG. 1 is a face view of a rotatable brake or clutch disc;

FIG. 2 is a perspective view of a rotatable disc assumed having carbonized filaments running in the transverse directions shown;

FIG. 3 shows a modification;

FIG. 4 is a schematic illustration of a process for fashioning a brake or clutch disc as a woundup article;

FIG. 5 shows the resultant article;

FIG. 6 is a modification usable as a pad for a disc type brake or clutch;

FIG. 7 is a modification usable as an arcuate brake shoe;

FIG. 8 shows a button structure;

FIG. 9 illustrates a trapezoidal article;

FIG. 10 shows a wound article with a differential composition; and

FIG. 11 is an elevational section showing a friction couple, part broken away.

DESCRIPTION OF PREFERRED EMBODIMENTS

In U.S. Pat. No. 3,033,326 issued May 8, 1962 on an application of C. A. Byers and assigned to the assignee of the present invention, there is described a friction article which, as in the present FIG. 1 has a rotating disc 10. For rotating the disc, the outer periphery has keyways 11 engageable by keys assumed secured to a rotatable brake member (not shown). To provide against cupping or other distortion of the disc during use due to heating thereof, the disc is provided with radial slots 12 extending from the inner periphery.

In the patent it was assumed that a metal plate 10 was covered at 13 with a friction facing which was a sintered and bonded layer of powders predominantly metallic. Such friction facing metals are not (except as possible tailoring agents in minor quantity) used to any great extent in practicing the present invention, and each friction facing 13 is substantially 100 percent carbon and running-in-air, e.g., against a mating surface perhaps of solid metal, or perhaps (and often preferably) itself of carbon.

Each facing 13 can be molded from chopped fibers of cellulose, or other carbonizable material, together with a resin later also to be carbonized, or can be molded from powders of graphite (or other form of carbon) plus a carbonizable resin. Thus the carbon article is constructed by molding carbon or carbon forming materials with resins of high coking value and sintering at a temperature sufficient to obtain carbon-to-carbon bonded structure. For this and all the other embodiments described, the sintering is done in a protective atmosphere, to prevent coking or burning of the carbon. For the initial resin a furfuryl alcohol resin has been found ideal but many other resins have a sufficiently high carbonizing value (e.g., 48 percent or better C) and are useful, as is coal tar pitch (but not an epoxy). Good results have been obtained by using, by weight:

40 to 60 Powdered Graphite
20 to 40 Powdered Petroleum Coke
20 Powdered Phenol Furfural Resin.

Random fibers molded with a resin which is then not just cured but carbonized, as are the fibers, have been found even better as far as coefficient of friction is concerned but sometimes not as good (as the molded powders) as soon as wear of the resultant article is considered.

Of importance is the fact that the resin is not merely polymerized or cured (at something like 400°— 800° F.) but carbonized, by sintering at 1200° to 1850° F. In any event, the new material 13 is capable of operating during use at temperatures in excess of 2500° or even 3500° F., but the metal core 10, if made of any metals of acceptable density, will not stand such temperatures. Yet, particularly for use on large aircraft where light weight and high energy absorption and dissipation become of importance, it is very advantageous to run materials at such elevated temperatures. This leads to consideration of the advantages of the articles proposed in other FIGS. of the drawing.

The article 20 of FIG. 2 is assumed made by laying up flat sheets of a cellulosic material each impregnated with a carbonizable resin and the whole assembly then pressed and sintered at an elevated temperature such that the resin is not merely cured but, like the fabric, substantially completely carbonized. However, the warp 21 and the woof 22 (in other words the entire fabric) may have been carbonized either before the resin was applied or, as during the final sinter, after the resin was applied. In any event as different layers 20A, 20B, 20C are laid up and pressed and sintered together, there results a uniform article strong enough to require no backing plate because in and of itself the carbonized article 20 is a complete structural article capable of operating in the previously assumed environment as soon as driving slots 23 are milled or otherwise provided in its periphery. Expansion slots (such as 12 in FIG. 1) are less necessary because of the carbon's physical characteristics but could be used (though not shown in FIG. 2). In any event (whether or not there be expansion slots), the structural, spline driveable, article of FIG. 2 obviates disadvantageous weight and operating temperature limitations of conventional (i.e., ferrous) metal backing plate. And if the opposing surface is also a part which is a structural all carbon article, once again weight is reduced and permissible operating temperature raised.

In FIG. 3, trapezoidal sections of friction material 30 are assumed to be laid up sections of flat sheets (possibly cut from rings) and substantially completely carbonized by sintering. In the FIG. 3 arrangement the compacted carbon-to-carbon bonded formerly cellulosic layers of carbon material are assumed contained in metal cups 31 secured as by rivets 32 to a solid metal backing plate 33, but then again (as in FIG. 1) advantages of light weight and high temperature operability (of the carbon) are limited, (e.g., because of characteristics of the metal backing 33), a situation which many of the other embodiments obviate.

FIGS. 4, 5, 8 and 10 show substantially all carbon friction articles in the shape of a volume of revolution, reinforced by successive lay up of tape or of one or more filaments by continuous winding. Again there was once a resin of high coking value but it first polymerized or otherwise cured and then carbonized at the final temperature required to obtain the desired carbon to carbon bonded structure.

In FIG. 4, 40 might be a one-half or three-fourth inch wide cloth tape pulled from a supply reel 41 and taken through a controlled atmosphere furnace 42 for carbonizing the cloth, to obtain a desirable, and controllable, shrinkage at this point. The tape might be of ordinary cloth, or of rayon, a special form of rayon known by the Trademark Villwyte, available from Industrial Rayon Division of Midland Ross Corp., being useful because of its good carbonizing ability. The carbonized tape 40 is next drawn through a solvent and resin containing tank 43. Friction modifiers, as hereinafter described, can be supplied by stirring them in with the resin, in the tank 43. A heat source, indicated symbolically at 44, is next used merely to evaporate solvent from the resin while the material is continuously wound up on a mandrel 45. Next the coiled article 40' is cooled, the mandrel 45 is removed (to permit i.d. shrinkage) and lastly the article is sintered in a controlled atmosphere oven 46 (not to scale) to carbonize the resin. Instead of the shaftlike mandrel 45, good results have been obtained by using as a mandrel a cardboard tube which then need not be deliberately removed, since it carbonizes and falls apart during the sintering process.

A workable procedure, different from that shown by FIG. 4, is to use Villwyte, wind on mandrel, resin impregnate, cure at 450° F., precarbonize at 700° F., carbonize at 1300° F., reimpregnate with uncured resin, and recarbonize at 1300° F., with the mandrel removed at a time appropriate to prevent the article from tearing itself apart during the process.

For any embodiment, carbonizing the materials might be one step (avoiding coking by using a controlled atmosphere), or two, or might be done by three steps of heat application, but the FIG. 4 process has the advantage of more control of stressing, stretching and shrinkage, readily making things stronger; though this somewhat depends on balancing the necessities of handling (some materials being weaker than others) as against the advantages of shorter processing time, or lower temperatures.

FIG. 5 shows an all carbon article 50 resulting from the FIG. 4 process. Particularly if, instead of a tape 40 in FIG. 4, one or more single filaments 40 are applied evenly across a width as by a traverse like that of a fishing reel, then all the carbonized nonmineral filaments 51 may substantially follow the direction of operative brake or clutch relative rotation, as indicated by the arrow 52. Many modifications may be made, and, in order to reinforce the area of driving slots 53, the threads may be taken, or part taken, around such slots. One way of doing this is to have at least one punch, pointed, or rounded as is 47 in FIG. 4, which will reorient the filaments during windup and during final carbonization by indenting rounded notches in the coil periphery, with such part-formed notches later machined out to provide suitable corners as shown for 53 in FIG. 5. Even so, with notches part-formed at one time and finished at another, the filament or filaments (as at 51') are compressed about the driving notches (53) in such manner as to give greatest strength where most needed.

Alternatively, a woundup filamentary ring (such as 50 in FIG. 5, but without any notches) could be radially cut to provide part-rounded trapezoidal shape brake or clutch pads such as shown at 60 in FIG. 6, with the advantage that the filaments lie 100 percent (in the case a filament is wound) to 50 percent (if a tape is wound) substantially in the direction of relative rotation as indicated by arrow 61.

Supposing that the annular coil as made in FIG. 4 has suitable axial length and then a sector is cut therefrom so as to provide an arcuate brake shoe facing 70, as seen in FIG. 7. Such a facing may be adhesively or otherwise bonded or fastened integrally to a conventional brake shoe Tee made up of a sole plate 71S and a web plate 71W. Here, even if a tape were used, all of the filaments will be substantially parallel with the rubbing surface, while if a single filament is used they will lie substantially along the direction of relative rotation (arrow 72 in FIG. 7).

In any event, but particularly if a tape is used, the woundup article provides a strong columnar effect (of carbon bonded carbon filaments) to keep the all-carbon structural part from collapsing (e.g., due to pressure of engagement in FIGS. 5 or 6).

A relatively larger central mandrel can be used as would be most economical for developing the structure of FIG. 7, or a relatively smaller central mandrel might be used as for fashioning and later resin carbonizing a coil to produce the FIG 8 article 80 with small center hole 81. Such article might of itself be used as a pad (comparable to the pads 30 in FIG. 3), or might be reformed (before sintering) to provide the FIG. 9 trapezoidal article 90 in which the central hole 81 either might or might not have disappeared.

The article of FIG. 8 might either be pressed and sintered (carbonized) as-is (e.g., at a pressure of 12 ½ TSI and temperature of 1800° F.), or it could be left uncured and then pressed into the trapezoid article of FIG. 9 and then sintered.

While the arrangements of FIGS. 8 and 9 may not have the advantage of all filaments lying along rotation direction (see arrow 92 in FIG. 9) they do have the advantage of good columnar support.

FIG. 10 shows a modified article which is a woundup article with a differential composition. That is, suppose there is first wound a resin soaked precarbonized (or later carbonized) thread 100 about a mandrel (not shown). It would probably not be feasible to use a toothed mandrel, so it is assumed that driving slots 101 are later provided, as by machining. Then, at a demarcation line 102 another filament (or filaments) 103 is joined on and the coil completed, the turns 103 not only again incorporating resin but also friction tailoring agents (conventionally powders and in any event weaker than the carbonized cloth), such agents existing either as discrete incorporates with the filaments and with the resin, or as separate interleaved layers. The result, then, is an article which is stronger at the driving splines, but has superior friction properties further out, where the opposing surface (not shown) may be made to engage. Alternatively, driving slots and single filament could be at the outside, and Si C, Alumina, Iron or other conventional rubbing performance improving agents added only towards the inside. As another alternative, strengthening agents, e.g. a metal or ceramic filler or an added step resin cure, could be added only at area of tooth engagement and not at area of rubbing (friction) engagement.

FIG. 11 shows broken away parts of a friction couple, or mating pair, consisting of two, relatively rotatable, centrally hollow discoids 110, 111, each coaxial with a mutual axis 112. The element of novelty is that each of the discoids is all (as indicated on the drawing), or substantially all, or at least 80 percent, as explained hereinafter, carbon. Except for this novelty, the discoids may be conventional, and one have inner periphery (e.g. driven) engaging means such as notches 114 and the other have outer periphery (e.g. driving, as in a clutch, or hold-stationary, as in a brake,) engaging means such as notches 115. As explained in various patents, including the Graham et al. patent and the Byers patent, both mentioned before, means such as pistons, springs or other mechanical motions are used to cause engagement and disengagement in the axial direction, as indicated by the double arrow line 117 in the present FIG. 11. In the manner shown (i.e., carbon vs carbon), highest operative temperatures (of themselves allowing higher energy dissipation so things may be more efficient, thus smaller, hence lighter) may be reached, and lightness and simplicity of structure according to the invention is enhanced (as contrasted with having but one member of the couple of carbon).

There is thus provided structural friction articles of light weight and high heat strength capable of meeting other requirements of good friction properties and, in addition, capable of providing smooth, vibration free operation without danger of seizure, welding or galling.

Another advantage of the running-in-air all carbon article is that, according to tests under identical test conditions, coefficient of friction is improved over that of the best predominantly metallic prior art, and the friction properties do not fade with increasing temperature of operation and are suitable even at operating temperatures in excess of the melting points of currently used predominantly metallic articles and in excess of the charring point of currently used nonmetallic articles, e.g. of asbestos.

In each of the cases shown in FIGS. 2, 5, 10 and 11 the article is not only tough and hard but complete (no backing plate needed), and to some extent this is true of FIG. 7 (no conventional backing plate needed for handling, or for attachment to the Tee at 71S).

FIGS. 4, 5, 6, 7 and 10, show the advantage of filaments following relative rotation, with a strengthening as the wound cylinder is finally heated and then shrinks upon itself, resulting in a structural article, and, as in FIGS. 4, 5 and 10, reinforcement of driving notches (e.g., densification of filaments thereabout) is easy to accomplish, and the wound article is very resistant to delamination.

The opposing member might be cast iron (as in automotive brakes or clutches), or of steel, but preferably it is a similar substantially total carbon article and thus has all the same advantages (as does each described facing) of light weight, high strength, easy fabrication, self-lubrication, high coefficient of friction, good torque peak ratio (good ratio of peak torque to average torque for one engagement), high thermal conductivity, no deformation due to either mechanical shock or thermal changes, and zero fade (for either one stop or due to the heat of many).

An outstanding advantage of the invention is that whereas in the prior art comparable temperature (e.g. 1800° F.) for sintering predominantly metallic mixes, or prior art lower temperature (e.g., 800° F.) for polymerizing a resin bonding agent for a mineral filler such as asbestos, or for anything else, could neither one assure satisfactory operation at higher temperatures (e.g. at 3000° F.) because of temperature fade (the hotter it gets the lower the coefficient of friction, because of a developed film of melted metal or resin), the new carbon bonded practically all carbon nonmetal, nonasbestos arrangement assures good operation at such higher temperature.

As the terms "substantially carbon" and "consisting essentially of" are used in the specification and the claims we mean that the filler is substantially carbon and the binder is substantially carbon even though there may be some (not more than 8 or 10 percent) molecules containing hydrogen and oxygen economically difficult to drive out, and even though there may have been a purposeful addition (not more than a total 10 or 12 percent) of one or more friction tailoring or strengthening agents (e.g., silicon carbide, or alumina, or cast iron grit, etc.), thus "substantially carbon" or "consisting essentially of carbon" can be taken to mean "at least 80 percent carbon, by weight." In other cases the filler might not even be carbon, as for one layer of the species of FIG. 2, or FIG. 10, since a ceramic fiber, such as that known as "Fiberfrax" (a trademark of The Carborundum Company) or exotic metal such as beryllium or other high temperature resistant material could be used instead, for while we have illustrated and described particular embodiments, various modifications may obviously be made without departing from the true spirit and scope of the invention intended to be defined only by the appended claims. Thus, instead of adding friction modifiers to an original mix (thus ultimately throughout) they might be applied to merely modify the surface. Thus there could be an attached or bonded facing of graphite or there could be a spray coating (e.g., a plasma or flame spray of inter-metallics, such as Al Ni) or a vapor deposition of a heat resisting refractory (e.g., TiC) on one or both surfaces of the friction couple made up of so-called friction member and opposing member. Even so, while at the surface of the article so treated metals may constitute 50 percent or 100 percent; considering the structural article as a whole its strength and lightness and heat resistance will be due to the fact that it is at least 80 percent carbon overall, and such an article is intended to be covered by any claims, the coating whether or not itself of carbon being an infringing variant, whether or not it provides improved compatibility with the other rubbing surface.

We claim:

1. A high energy absorbing friction article which is a unified structural member for running in air and which is characterized by light weight and superior heat resistance even at operating temperature as great as 3000° F.,
   the combination of a carbonized filamentary material and a carbonized in situ resin binder material associated with said carbonized filamentary material and providing carbon to carbon bonds therewith,
   whereby to provide superior strength in the substantially all carbon friction article.

2. A pair of relatively rotatable friction articles as defined in claim 1 comprising a friction couple adapted to be selectively engaged and disengaged, and said couple having light weight, low inertia, high temperature operation, and good friction properties.

3. Friction article as in claim 1 further characterized by up to 12 percent by weight friction modifier.

4. Friction article as in claim 1 further characterized by the article being all, or an arcuate part, of a volume of revolution generated by winding at least one filament impregnated with a carbonizable resin later carbonized.

5. Friction article as in claim 4 further characterized by the article being an arcuate part cut from a volume of revolution and usable as a brake shoe lining for engaging a mating brake drum, the shoe article having an arcuate wear surface in which 50 to 100 percent of filamentary reinforcement is substantially in line with relative rotation between said shoe and the mating drum.

6. Friction article as in claim 4 further characterized by the article being an arcuate part cut from a volume of revolution and usable as a brake or clutch friction pad when affixed to a disc, with 50 to 100 percent of filamentary reinforcement within the pad article and at a plane of mating with a relatively rotatable opposing surface extending substantially in the direction of relative rotation while the remaining 50 to 0 percent of filamentary reinforcement extends transversely and in the direction of brake or clutch application pressure.

7. A friction article having the characteristics and arrangement as in claim 1 and further characterized by the carbonized filamentary material comprising laid up layers of originally flat sheets with final carbon-to-carbon bonds both between and within the layers.

8. A friction article as in claim 7 further characterized by the article having a facing of non filamentary material.

9. A friction article as in claim 8 further characterized by the facing being carbon.

10. A pair of relatively rotatable friction articles as defined in claim 2 further characterized by at least one of the articles of the pair having a carbonized filamentary material backing portion and a facing portion which is of non filamentary carbon.

11. A friction article for operating as a structural member, said article being a hollow discoid having inner and outer peripheries and a rectangular cross section therebetween and having mechanical driving or holding notches in one of said peripheries, said article consisting essentially of (1) filamentary material which is substantially carbon and wound generally coaxial with said peripheries, and (2) a binder residue which is substantially carbon and provides carbon-to-carbon bonds with the filamentary material.

12. A friction article as in claim 11 further characterized by filamentary material density adjacent the notches being greater than filament density elsewhere in the article.

13. A friction article comprising carbonized woundup layers of filamentary material and a carbonized in situ resin binder material associated with said carbonized filamentary material and providing carbon-to-carbon bonds therewith, said article having an inner periphery and an outer periphery, and having a differential composition such that material of the article adjacent one of said peripheries has different strength and friction properties than the strength and friction properties of material of the article adjacent the other of its peripheries, whereby to provide maximal article mechanical driving strength properties adjacent one periphery and maximal friction material properties adjacent the other.